United States Patent [19]

Million

[11] Patent Number: 4,828,161
[45] Date of Patent: May 9, 1989

[54] METHOD AND DEVICE FOR MANUFACTURING THIN-WALLED HOLLOW BODIES OF CONCENTRIC METAL LAYERS

[75] Inventor: Karl Million, Oberhausen, Fed. Rep. of Germany

[73] Assignee: Man Gutehoffnungshuette GmbH, Fed. Rep. of Germany

[21] Appl. No.: 195,775

[22] Filed: May 19, 1988

Related U.S. Application Data

[62] Division of Ser. No. 133,024, Dec. 15, 1987.

[30] Foreign Application Priority Data

Dec. 16, 1986 [DE] Fed. Rep. of Germany ....... 3642886
Jan. 8, 1987 [DE] Fed. Rep. of Germany ....... 3700377

[51] Int. Cl.$^4$ .............................................. B23K 9/04
[52] U.S. Cl. .................... 228/46; 228/222; 219/76.1; 219/76.11; 219/61.7
[58] Field of Search ............. 228/222, 46; 219/76.1, 219/76.11, 76.12, 61.7

[56] References Cited

U.S. PATENT DOCUMENTS

| | | | |
|---|---|---|---|
| 2,254,314 | 9/1941 | Reed | 228/46 |
| 3,219,397 | 11/1965 | Heldenbrand et al. | 219/76.11 |
| 3,611,541 | 10/1971 | Garrett | 219/76.11 |
| 4,101,067 | 7/1978 | Sloan et al. | 228/46 |
| 4,230,928 | 10/1980 | Janssen | 228/46 |
| 4,387,845 | 6/1983 | Mefferd | 228/222 |

Primary Examiner—Nicholas P. Godici
Assistant Examiner—Samuel M. Heinrich
Attorney, Agent, or Firm—McGlew & Tuttle

[57] ABSTRACT

A method and device for manufacturing thin-walled hollow bodies comprising concentric layers employs, for thin-walled structural parts of chemical installations subjected to stress at high temperatures, non-layered pipes of single-metal materials. Due to the methods of manufacture, structural parts of these materials have disadvantages because the single materials of which they are built cannot simultaneously satisfy the demands of corrosion resistance, high-temperature stability and resistance to scaling. According to the new method, for example, thin-walled pipes of concentric, non-corrosive, high-temperature stable, and non-scaling material layers are intended to be produced. For the non-corrosive inner layer, for example, a conventional thin-walled pipe is used. On this pipe high-temperature stable as well as non-scaling layers are produced through build-up welding with one or several welding heads in a manner such that during build-up welding, the thin-walled pipe is filled with a pressurized cooling medium. In build-up welding, the inner pipe is subdivided by partition walls into one or several cooling sections 5 and provided with sectionally functioning cooling circulations adapted to the number of welding heads in the welding regions. The hollow bodies manufactured according to the method are primarily used in high-temperature installations in the chemical industry.

3 Claims, 2 Drawing Sheets

METHOD AND DEVICE FOR MANUFACTURING THIN-WALLED HOLLOW BODIES OF CONCENTRIC METAL LAYERS

This is a division of application Ser. No. 133,024, filed Dec. 15, 1987.

BACKGROUND OF THE INVENTION

Field of the Invention

The invention relates in general to welding and is a method for manufacturing thin-walled hollow bodies of concentric, largely non-corrosive, high-temperature stable, and non-scaling metal layers and to a device for carrying out the method.

Thin-walled hollow bodies, for example, pipes and pipe bends of concentric metal layers can in the chemical industry, especially in high-temperature installations, in which temperatures of up to 1200° occur, be required to have simultaneously several properties like corrosion resistance, high-temperature stability, and resistance to scaling.

For the specific thin-walled structural components of the previously mentioned installations non-coated pure materials are used. Due to the method of manufacture, structural parts of these materials have disadvantages, because the individual materials of which they are made, can simultaneously possess only to a limited extent several material characteristics, like corrosion resistance, high-temperature stability and resistance to scaling.

For these reasons, an aim is to find manufacturing methods, which permit constructing, for examples, pipes and pipe bends of different kinds of working materials structured in layers, of which each kind of working material is intended to have primarily only one of the mentioned working material characteristics.

SUMMARY OF THE INVENTION

The invention provides a method and a device for the manufacture of thin-walled hollow bodies of concentric, largely non-corrosive, high-temperature stable, and non-scaling metal layers.

Weld plating and mold welding of thick-walled hollow bodies of ferritic and austenitic materials is known.

Methods for manufacturing thin-walled hollow bodies, in which the wall of the parts is structured in layers each having separate functions are not known. The method according to the invention enables the manufacture of thin-walled structural parts of a composite which resists stresses in high-temperature installation applications.

According to the method of the invention, for example, a thin-walled pipe of non-corrosive, high-temperature stable and non-scaling concentric layers is produced by applying to a conventional pipe of non-corrosive material: firstly build-up welding layers of high-temperature resistance material and, subsequently, onto these layers, further layers of non-scaling material. At the same time, pressurized inner cooling takes place for the purpose of maintaining a precisely circular pipe and for rapidly cooling the weld bead during build-up welding.

Pipes described in the preceding, can, for example, be utilized in installations, in which a chemically aggressive medium flows through the pipe and in which the pipes are exposed on the outside to the effects of high temperatures i.e., these pipes are then non-corrosive on the inside and non-scaling on the outside.

If pipes are required, which, conversely, must be non-scaling on the inside and non-corrosive on the outside, such pipes can be manufactured by applying, using build-up welding, a high-temperature resistant and subsequently a non-corrosive layer to the outside of a conventional supporting port. The pipe subsequently is weld plated on the inside to be non-scaling with during build-up welding. It is cooled with a pressurized cooling medium. During weld plating of the pipe on the inside and on the outside, if necessary, cooling likewise can be carried out.

Accordingly, it is an object of the invention to provide a method of manufacturing, concentric thin-walled hollow bodies with concentric, largely non-corrosive, high-temperature stable and non-scaling metal layers using a conventional thin-walled hollow body as a material support which comprises preparing an inner layer on the support and forming additional outer layer following the inner layer by build-up welding with one or more welding heads such that during the build-up welding, the thin-walled material support is filled with a pressurized cooling medium.

A further object of the invention is to provide a device for thin-walled welding which includes a thin-walled hollow body, a plurality of weld layers formed on said hollow body and a means for subdividing said hollow body into a plurality of cooling sections, means closing off each end of said hollow body and dividing said hollow body into a plurality of sections and means for supplying a cooling liquid into each of said sections during welding.

A further object of the invention is to provide an apparatus for thin-walled welding which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

GENERAL DESCRIPTION OF THE PREFERRED EMBODIMENT

Figure 1:
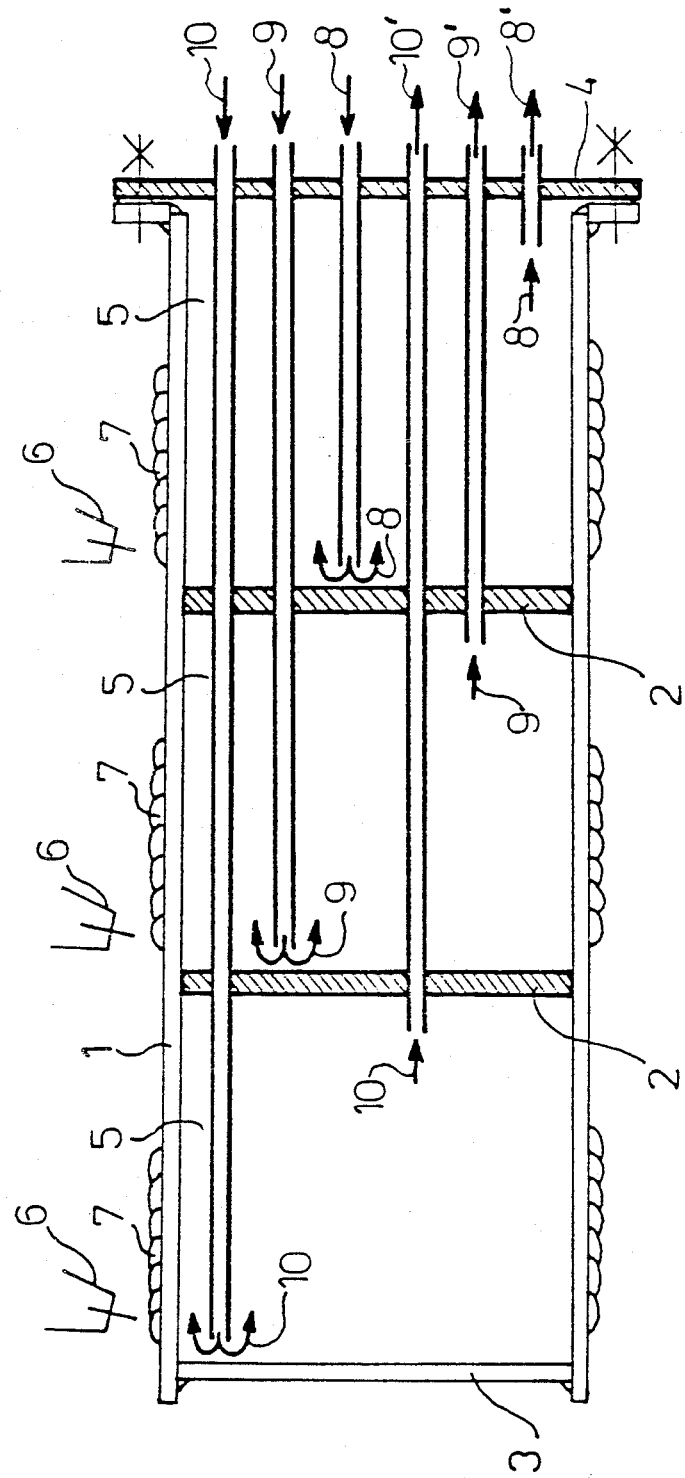
FIG. 1 is a longitudinal sectional view through a length of pipe with an internal cooling device according to the invention.

Referring to the drawings, in particular, the invention embodied therein comprises a method for manufacturing thin-wall hollow bodies of concentric, largely non-corrosive, high-temperature stable, and non-scaling metal layers in which a length of pipe is used as a support and various welding layers 7 are built up over the support.

According to FIG. 1, a length of a thin-walled conventional pipe 1 of a non-corrosive material is shown in the horizontal position. On the length of pipe 1 build-up welding of high-temperature layers 11 is continuously carried out by the welding heads 6.

A cooling device is introduced into the length of pipe 1 so that, during build-up welding, both the dimensional stability of the pipe when exposed to shrink forces of the welding beads is maintained and the heat—generated during the welding process by the thermal energy introduced is reliably and predictably removed.

The cooling device comprises a plurality of partition walls 2, which have circular cross-sections and are adapted to the inner diameter of the length of pipe 1. Cooling medium pipes 9 and 10 for the fluid cooling medium penetrate through each partition wall. The cooling device further has an end plate 4 through which the pipes 9 and 10, as well as the additional pipes 8, are led.

Before introducing the cooling device into the length of pipe 1, a partition wall 3 is welded to one end thereof. The cooling device set into the pipe 1 divides the pipe with the aid of the partition walls 2 into three sections 5. The end plate 4 is removably connected with the outer end of the pipe 1.

The number of sections 5 of the cooling device corresponds to the number of the welding heads 6.

Through the pipes 8, 9 and 10, fluid cooling medium, for example water, is introduced from the outside in the direction of the arrow, into the distinct sections 5. The heated cooling medium is removed through pipes 8', 9', 10' from the discrete sections 5 of the cooling device.

As soon as the welding process, i.e., the build-up welding of the individual layers onto the conventional inner pipe, is completed, the cooling device is removed after the end plate 4 has been removed from the length of pipe 1 and can be used again for the manufacture of additional lengths of pipe.

The partition wall 3 and the flange for the end plate 4 welded onto the other end of the length of pipe are cut off from the finished length of pipe 1. Successive lengths of pipe can be manufactured seriatum in the same way and the finished lengths of pipe can then be welded together to a pipe line.

Instead of the described cooling device using fluid cooling medium an expanded metal mandrel—not shown—preferentially of copper can be used. The mandrel is inserted into the length of pipe and pressed against the inner wall of the pipe. Here, the good heat conducting properties of the copper are exploited for removing the welding heat. The mandrel may consist of a cooling body of circular cross-section composed for example of two or three hollow parts provided with a water or air cooling circulation. The hollow mandrel parts may, similar to the example in FIG. 1, be subdivided into several sections.

Figure 2:
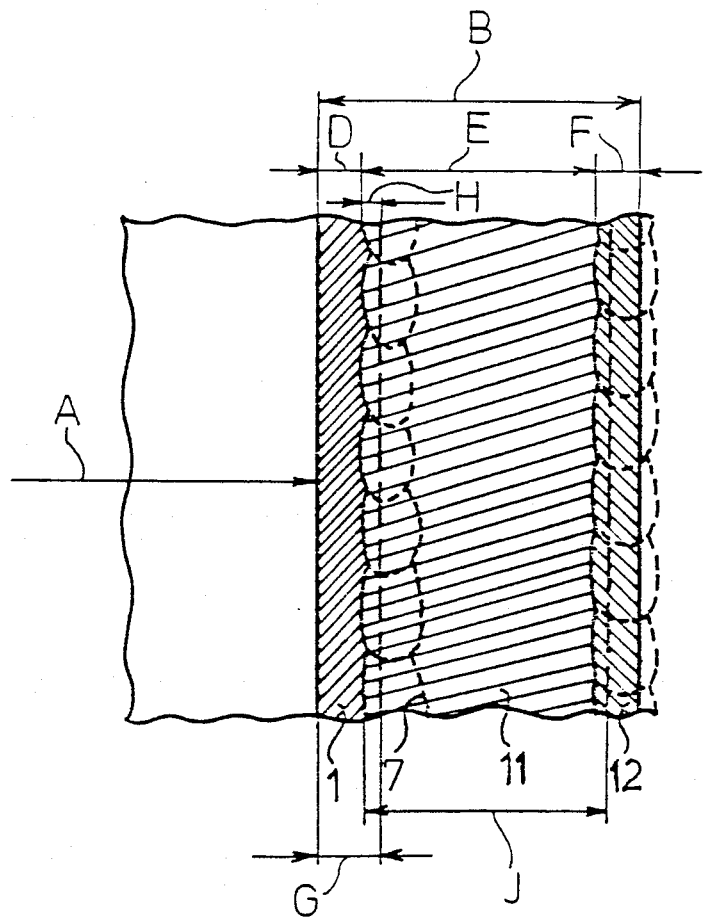
FIG. 2 is a sectional view of the build-up of the layers of the pipe wall.

The manufacture of three-layered pipes, for example, is described below in conjunction with FIG. 1 and 3, in order to produce such pipes having an inner diameter of 100 mm (A according to FIG. 2), an overall thickness B of 8 mm, and a length per length of pipe of 2000 mm, with the non-corrosive inner layer D of the pipe 1.5 mm, the high-temperature stable middle layer E subjected to pressure 5 mm, and the non-scaling external layer F 1.5 mm.

A conventional pipe having a diameter of 104 mm is selected for the non-corrosive inner internal layer D together with, a wall thickness G of 2 mm and 2100 mm length. The 100 mm in excess of length 2000 mm are allowances for building in the partition wall 3 and the end plate 4 in accordance with FIG. 1.

Likewise, according to the invention, water is advantageously used as cooling medium, for example, and pressurized so that after build-up welding, the inner pipe stays exactly circular and as a result of the effect of the welding shrink forces reaches a final inner diameter A of 100 mm.

According to the patent claims build-up welding of the 2000 mm long length pipe is carried out with several welding heads, with, in this application example, each of the four welding heads having a welding range of 500 mm length.

In order to ensure that during the build-up welding of the first high-temperature stable layer 7 onto the inner pipe 1 the low penetration depth H of 0.5 mm and correspondingly low mixing is ensured, for this application example, welding is done with the pipe in the vertical position.

The four stationary welding heads are advantageously applied to the inner pipe in such a way that, with each rotation of the pipe, all four welding heads are simultaneously axially adjusted by approximately $\frac{1}{2}$ welding head width and, after completion of a welding section 7 by 500 mm length radially, by a layer thickness respectively. After preparation of a welding layer the heads are brought back in the starting position.

According to another feature of the invention, a cooling device with, for example, four cooling sections 5 is used, within this relatively short length of pipe of 200 mm according to claim 5, the alternative of communicating cooling circulations being applied, and an approximately constant pressure being exerted in all cooling sections along the length of pipe. The quantity of cooling medium flowing through per unit of time is a function of the required cooling effect.

Subsequently, on the first layer 7 of the high-temperature stable material layer, in the same manner an overall thickness of at least 5.5 mm is build-up welded in several layers 1 and, if necessary, mechanically finished to a final dimension J of 5.5 mm.

Lastly, for example, using the same approach, however with the material suitable for non-scaling properties, an external layer 12 of at least 1.5 mm is build-up welded and reworked to final dimensions F. Subsequently, the allowances of 50 mm at both pipe ends are removed.

What is claimed is:

1. A device for build-up welding which comprises a length of pipe forming a support; a plurality of welding heads arranged along said pipe to cover different areas thereof; a plurality of partition walls subdividing said pipe into a plurality of axially extending cooling sections corresponding in number to the number of welding heads; and, means for supplying a pressurized cooling medium to the respective sections.

2. A device according to claim 4 wherein said cooling sections are pressurized to the same pressure by the cooling medium and the cooling circulation systems and are traversed by the same quantity of cooling medium per unit of time.

3. A device according to claim 4 wherein the partition walls are applied against the inner surface of the pipe providing a discrete cooling system for each section and means are provided for supplying respective of said cooling systems with a cooling liquid which flows into each section.

* * * * *